(12) United States Patent
Zhang

(10) Patent No.: US 12,461,373 B2
(45) Date of Patent: Nov. 4, 2025

(54) NEAR-EYE DISPLAY DEVICE

(71) Applicant: MIYA GLOBAL TECHNOLOGY CO., PRIVATE LIMITED, Singapore (SG)

(72) Inventor: Min Zhang, Singapore (SG)

(73) Assignee: MIYA GLOBAL TECHNOLOGY CO., PRIVATE LIMITED, Singapore (SG)

( * ) Notice: Subject to any disclaimer, the term of this patent is extended or adjusted under 35 U.S.C. 154(b) by 332 days.

(21) Appl. No.: 18/196,736

(22) Filed: May 12, 2023

(65) Prior Publication Data

US 2024/0134194 A1  Apr. 25, 2024
US 2024/0231095 A9  Jul. 11, 2024

(30) Foreign Application Priority Data

Oct. 25, 2022  (CN) .......................... 202211315721.2

(51) Int. Cl.
*G02B 27/01* (2006.01)
*G02B 5/30* (2006.01)
*G02B 27/09* (2006.01)

(52) U.S. Cl.
CPC ....... *G02B 27/0172* (2013.01); *G02B 5/3083* (2013.01); *G02B 27/0961* (2013.01); *G02B 27/0977* (2013.01)

(58) Field of Classification Search
CPC ................................................ G02B 27/0172
See application file for complete search history.

(56) References Cited

U.S. PATENT DOCUMENTS

| | | | |
|---|---|---|---|
| 2011/0134017 A1* | 6/2011 | Burke | G02B 27/0101 345/32 |
| 2015/0160529 A1* | 6/2015 | Popovich | G02B 26/101 359/200.8 |
| 2016/0077338 A1* | 3/2016 | Robbins | G02B 27/4205 359/489.08 |

(Continued)

FOREIGN PATENT DOCUMENTS

| | | |
|---|---|---|
| CN | 103837988 A | 6/2014 |
| CN | 105093366 A | 11/2015 |

(Continued)

OTHER PUBLICATIONS

Search Report for related EP Application No. 23170988.2 issued Mar. 15, 2024 (5 pgs).

(Continued)

*Primary Examiner* — Edmond C Lau
(74) *Attorney, Agent, or Firm* — ArentFox Schiff LLP; Joseph M. Maraia; Marlo S. Grolnic

(57) ABSTRACT

A near-eye display device includes a first optical cavity, a second optical cavity and a first reflector. The first optical cavity includes a first prism, a first reflective polarizing film prism, a phase delay film, a wedge-shaped lens and a second prism disposed in sequential order. The second optical cavity includes multiple array lenses disposed in sequence. The first reflector is disposed in correspondence with one end of the multiple array lenses and the first reflective polarizing film prism. The near-eye display device of the present disclosure can ensure that the near-eye display device has a small volume, a small thickness, and a large field angle.

10 Claims, 5 Drawing Sheets

(56) References Cited

U.S. PATENT DOCUMENTS

2018/0120559 A1    5/2018  Yeoh et al.
2018/0335628 A1*  11/2018  Hung ...................... G02B 6/00
2019/0278076 A1    9/2019  Chen et al.
2022/0091413 A1*   3/2022  Grabarnik ............ G02B 3/0056

FOREIGN PATENT DOCUMENTS

| CN | 105652441 A | 6/2016 |
| CN | 110187507 A | 8/2019 |
| CN | 113671712 A | 11/2021 |

OTHER PUBLICATIONS

First Office Action issued in CN Application No. 202211315721.2 on May 25, 2025, with English translation, 14 pages.

* cited by examiner

NEAR-EYE DISPLAY DEVICE

CROSS-REFERENCE TO RELATED APPLICATION(S)

This application claims priority to Chinese Patent Application No. 202211315721.2 filed Oct. 25, 2022, the disclosure of which is incorporated herein by reference in its entirety.

TECHNICAL FIELD

The present disclosure relates to the technical field of near-eye display, and in particular to, a near-eye display device.

BACKGROUND

Virtual reality (VR) technology for experiencing a virtual world through a computer simulation system, and augmented reality (AR) and mixed reality (MR) technologies, which involve overlaying the display content into the real environment background, have been rapidly developing. The near-eye display is an important technical hotspot for development of VR, AR and MR technologies.

However, existing near-eye display devices are bulky in size, with thickness ranging from 20 mm to 80 mm, resulting in a significant sense of compression when worn on the head. Moreover, the field angle is too small, for example, is below 50°.

SUMMARY

The present disclosure provides a near-eye display device, which can ensure that the near-eye display device has a small volume, a small thickness, and a large field angle.

The present disclosure provides a near-eye display device. The near-eye display device includes a first optical cavity, a second optical cavity and a first reflector. The first optical cavity includes a first prism, a first reflective polarizing film prism, a phase delay film, a wedge-shaped lens, and a first reflector disposed in sequential order. The second optical cavity includes multiple array lenses disposed in sequence. The first reflector is disposed in correspondence with one end of the multiple array lenses and the first reflective polarizing film prism. The first optical cavity, the second optical cavity and the first reflector are configured to enable an image source to: be reflected into the first optical cavity through the first prism, pass through the first reflective polarizing film prism, the phase delay film and the wedge-shaped lens in sequential order, then pass through the wedge-shaped lens and the phase delay film after being reflected by the second prism, be reflected into the multiple array lenses through the first reflective polarizing film prism, enter the first reflector through one end of the multiple array lenses, be reflected back to the multiple array lenses through the first reflector, and be reflected into an human eye through the multiple array lenses.

Optionally, the first prism is a bipyramidal prism.

Optionally, the first optical cavity is provided with a light guide plate.

Optionally, the first reflective polarizing film prism and the first reflector are arranged obliquely.

Optionally, the first optical cavity is further provided with a second reflector and a second reflective polarizing film prism. The second reflector is disposed corresponding to the first reflective polarizing film prism, and the second reflective polarizing film prism is connected to the first reflective polarizing film prism. The first optical cavity, the second optical cavity and the first reflector are configured to enable part of light to: be reflected by the first reflective polarizing film prism to the second reflector, be reflected by the second reflector to the second reflective polarizing film prism, pass through the second reflective polarizing film prism, the phase delay film and the wedge-shaped lens in sequential order, then pass through the wedge-shaped lens and the phase delay film after being reflected by the second prism, be reflected into the multiple array lenses through the second reflective polarizing film prism, enter the first reflector through one end of the multiple array lenses, be reflected back to the multiple array lenses through the first reflector, and be reflected into an human eye through the multiple array lenses.

Optionally, the first reflector is a micro electro mechanical system (MEMS) reflector.

Optionally, the phase delay film is a quarter-wavelength phase delay film.

Optionally, the phase delay film is attached to the wedge-shaped lens.

Optionally, a surface of the wedge-shaped lens facing away from the phase delay film is in a beveled structure.

Optionally, a surface of the second prism facing the wedge-shaped lens is a cylindrical surface with a conical coefficient.

According to the near-eye display device of the present disclosure, the first optical cavity and the second optical cavity are provided, the refractive elements are distributed within the first optical cavity and the second optical cavity, so that the thickness of the near-eye display device is reduced, moreover, a combination of the multiple array lenses, the first prism and the second prism is used, so that the field angle can be greatly improved.

Figure 1:
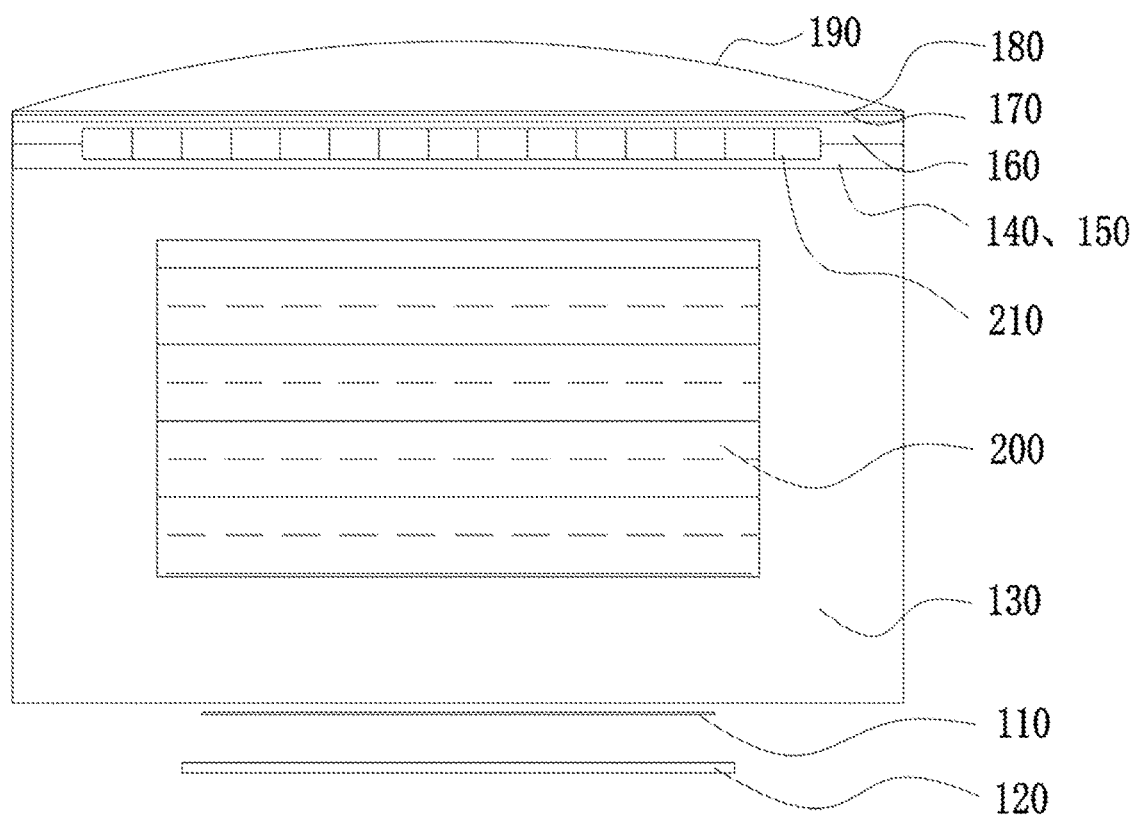
FIG. 1 is a schematic structural view of a near-eye display device according to an embodiment of the present disclosure.

REFERENCE LIST 110 single-row pixel image source
120 first prism
130 light guide plate
140 first reflective polarizing film prism
150 second reflector
160 second reflective polarizing film prism
170 phase delay film
180 wedge-shaped lens
190 second prism
200 array lens
210 first reflector

DETAILED DESCRIPTION

Technical solutions in embodiments of the present application will be described clearly and completely below in conjunction with the accompanying drawings in the embodiments of the present application. Apparently, the described embodiments are part of the embodiments of the present application, rather than all of the embodiments of the present application. All other embodiments obtained by those of ordinary skills in the art based on the embodiments of the present application without requiring creative efforts shall all fall within the scope of protection of the present application.

In the description of the present application, it should be understood that orientations or position relations indicated by terms such as "center", "upper", "lower", "front", "rear", "left", "right", "vertical", "horizontal", "top", "bottom", "in", "out" are orientations or position relations shown based on the drawings. These orientations or position relations are intended merely to facilitate and simplify the description of the present application and not to indicate or imply that a device or element referred to must have such particular orientations or must be configured and operated in such particular orientations, and therefore they are not to be construed as limiting the present application.

In the description of the present application, it should be noted that terms "mounted", "joined" and "connected" are to be understood in a broad sense unless otherwise expressly specified and limited. For example, the term "connected" may refer to "fixedly connected" or "detachably connected" or "integrally connected", may refer to "mechanically connected" or "electrically connected", or may refer to "connected directly", "connected indirectly through an intermediary" or "connected inside two elements". For those of ordinary skills in the art, specific meanings of the preceding terms in the present application may be understood based on specific situations.

Figure 2:
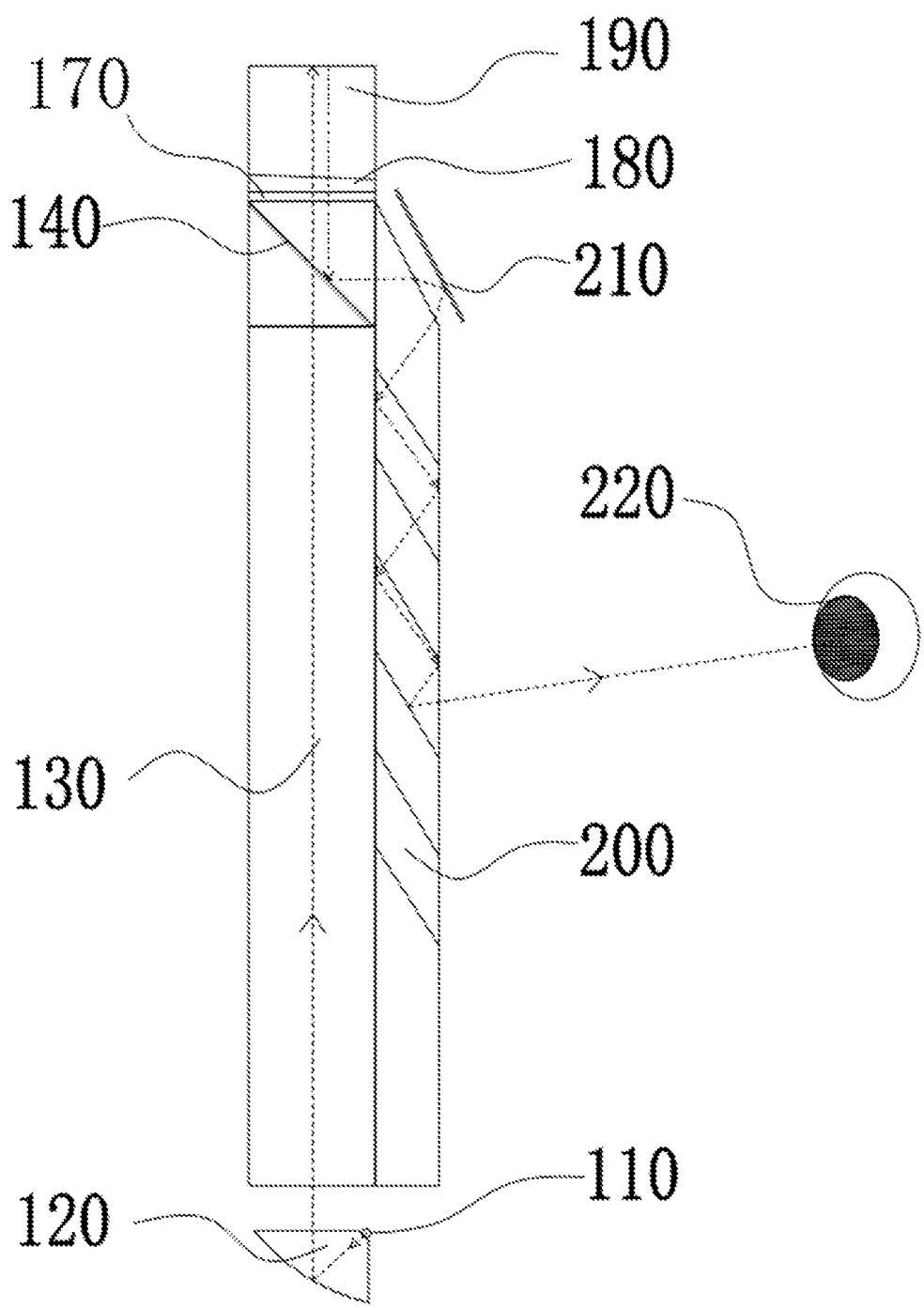
FIG. 2 is a schematic sectional view of a near-eye display device according to an embodiment of the present disclosure.

Referring to FIGS. 1 and 2, an optional embodiment of the present disclosure provides a near-eye display device. The near-eye display device includes a first optical cavity, a second optical cavity and a first reflector 210. The first optical cavity includes a first prism 120, a first reflective polarizing film prism 140, a phase delay film 170, a wedge-shaped lens 180, and a second prism 190 disposed in sequential order. The second optical cavity includes multiple array lenses 200 disposed in sequence. The first reflector 210 is disposed in correspondence with one end of the multiple array lenses 200 and the first reflective polarizing film prism 140. An image source is reflected into the first optical cavity through the first prism 210, passes through the first reflective polarizing film prism 140, the phase delay film 170 and the wedge-shaped lens 180 in sequential order, then passes through the wedge-shaped lens 180 and the phase delay film 170 after being reflected by the second prism 190, is reflected into the multiple array lenses 200 through the first reflective polarizing film prism 140, enters the first reflector 210 through one end of the multiple array lenses 200, is reflected back to the multiple array lenses 200 through the first reflector 210, and is reflected into an human eye through the multiple array lenses 200.

It should be noted that the multiple array lenses are parallel. The initial light comes from a single-row pixel image source 110.

In some optional embodiments of the present disclosure, the first prism 120 is a bipyramidal prism.

In some optional embodiments of the present disclosure, the first optical cavity is provided with a light guide plate 130.

In some optional embodiments of the present disclosure, the first reflective polarizing film prism 140 and the first reflector 210 are arranged obliquely.

Figure 3:
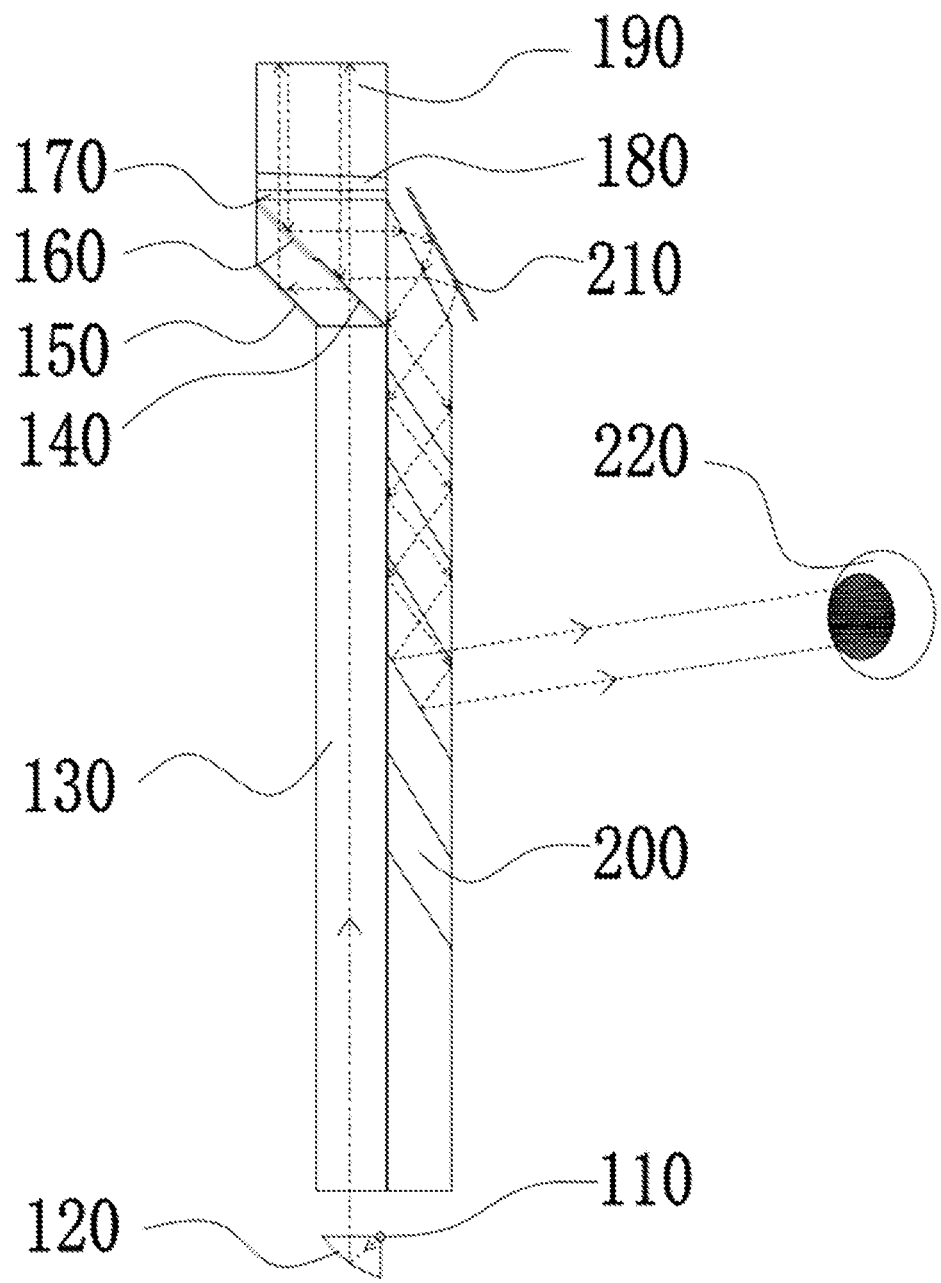
FIG. 3 is a schematic sectional view of a near-eye display device according to another embodiment of the present disclosure.
Figure 4:
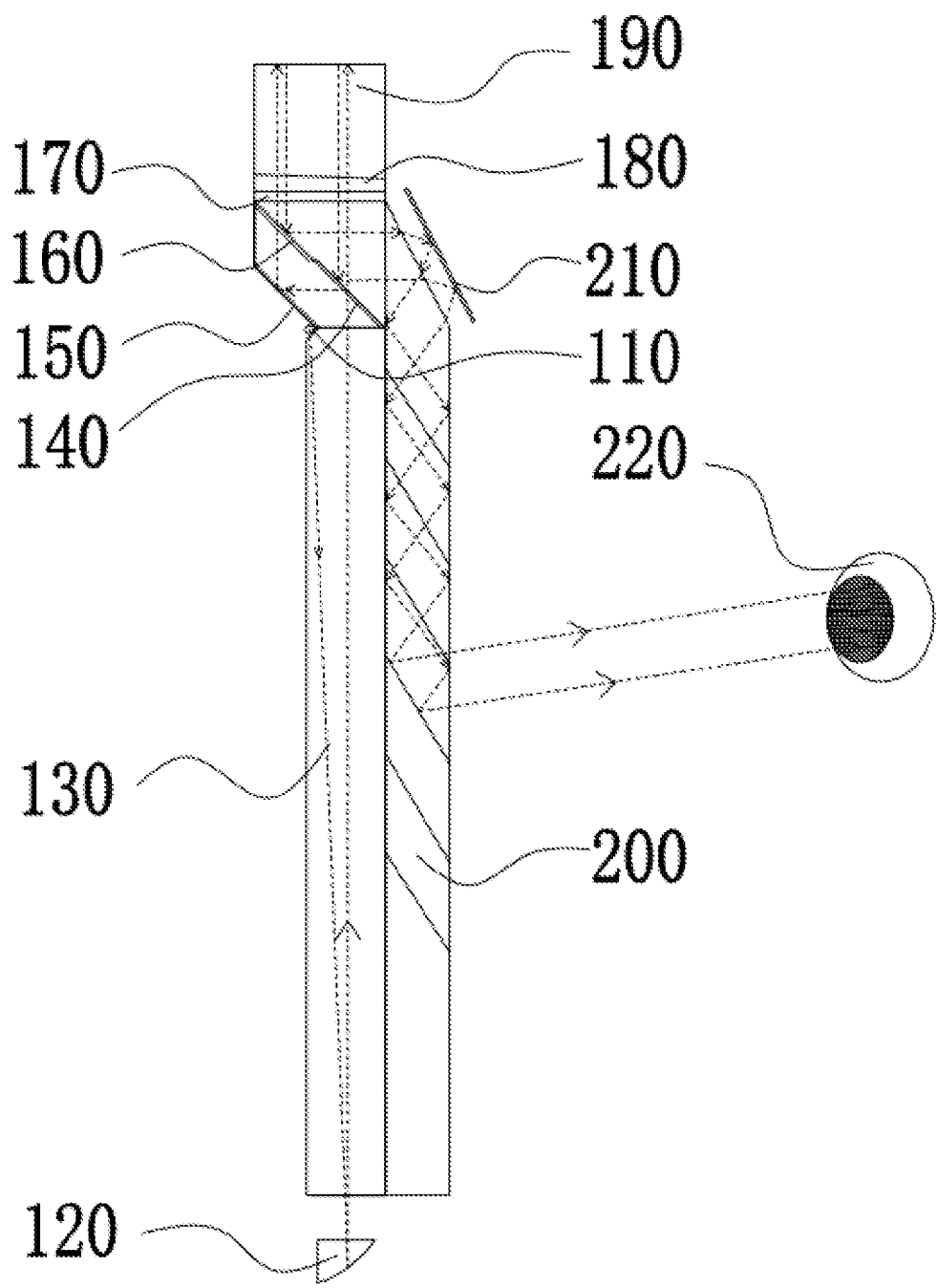
FIG. 4 is a schematic sectional view of a near-eye display device according to another embodiment of the present disclosure.
Figure 5:
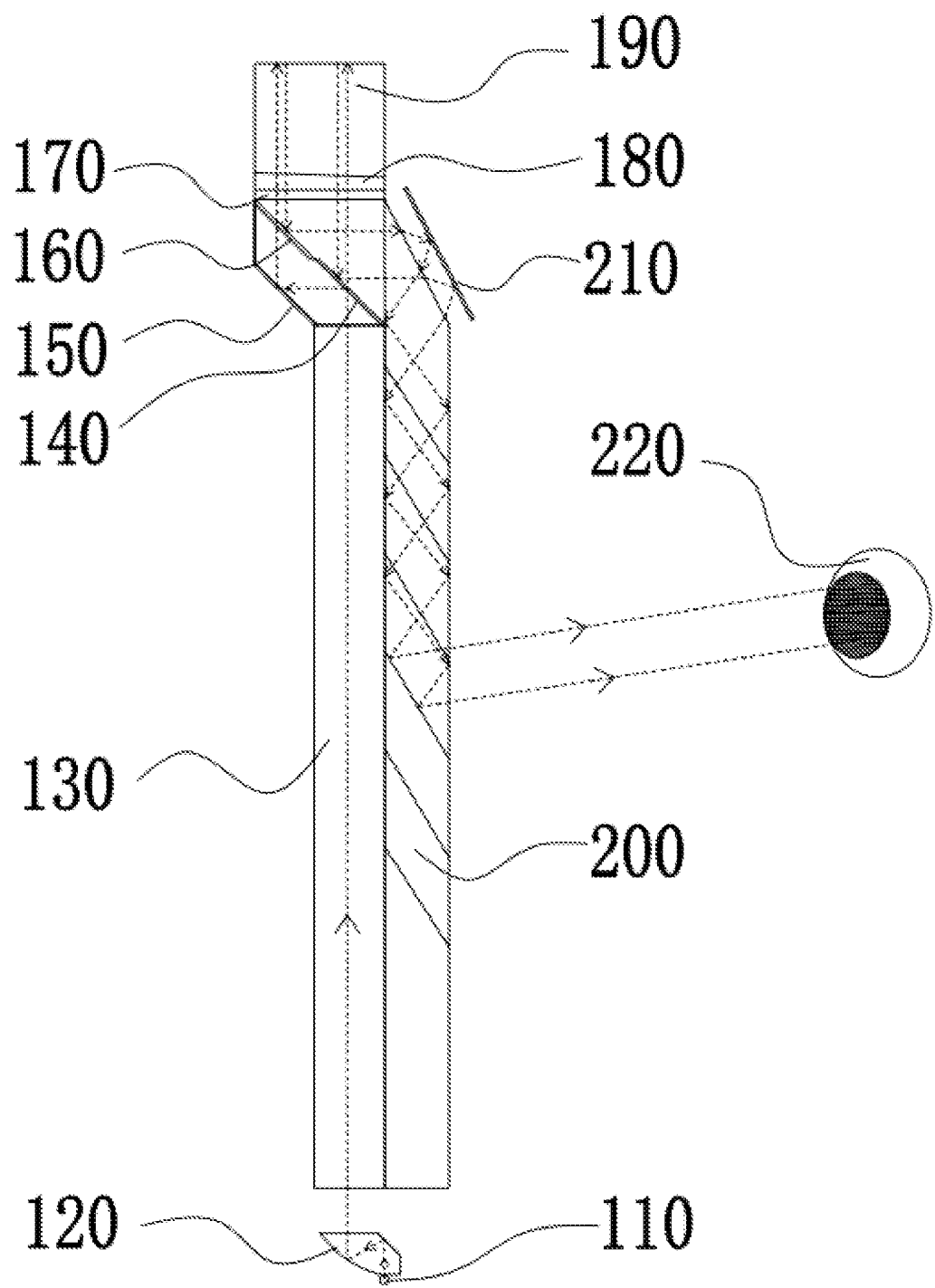
FIG. 5 is a schematic sectional view of a near-eye display device according to another embodiment of the present disclosure.

Referring to FIGS. 3 to 5, in some optional embodiments of the present disclosure, the first optical cavity is further provided with a second reflector 150 and a second reflective polarizing film prism 160. The second reflector 150 is disposed corresponding to the first reflective polarizing film prism 140. The second reflective polarizing film prism 160 is connected to the first reflective polarizing film prism 140. Part of light is reflected by the first reflective polarizing film prism 140 to the second reflector 150, is reflected by the second reflector 150 to the second reflective polarizing film prism 160, passes through the second reflective polarizing film prism 160, the phase delay film 170 and the wedge-shaped lens 180 in sequential order, then passes through the wedge-shaped lens 180 and the phase delay film 170 after being reflected by the second prism 190, is reflected into the multiple array lenses 200 through the second reflective polarizing film prism 160, enters the first reflector 210 through one end of the multiple array lenses 200, is reflected back to the multiple array lenses 200 through the first reflector 210, and is reflected into an human eye through the multiple array lenses 200.

Specifically, the first reflective polarizing film prism 140 is a P-light-transmissive reflective polarizing film prism. The second reflective polarizing film prism 160 is an S-light-transmissive reflective polarizing film prism. The light is separated into P light and S light, so that the utilization rate of the light is greatly improved, and the thickness of the light guide plate may be reduced in a limited manner under the condition of the same light effect.

In some optional embodiments of the present disclosure, the first reflector 210 is a micro electro mechanical system (MEMS) reflector. Specifically, the MEMS reflector is adopted to achieve the field scanning, whereby a volume of a field refractive imaging element is significantly reduced.

In some optional embodiments of the present disclosure, the phase delay film 170 is a quarter-wavelength phase delay film. Specifically, the P light and the S light separately pass through the quarter-wavelength phase delay film 170 twice, so that the original P light is converted into the S light, and the original S light is converted into the P light, and further, light may be reflected by the first reflective polarizing film prism 140 and the second reflective polarizing film prism 160.

In some optional embodiments of the present disclosure, the phase delay film 170 is attached to the wedge-shaped lens 180.

In some optional embodiments of the present disclosure, a surface of the wedge-shaped lens 180 facing away from the phase delay film 170 is in a beveled structure.

In some optional embodiments of the present disclosure, a surface of the second prism 190 facing the wedge-shaped lens 180 is a cylindrical surface with a conical coefficient. Specifically, since a concave surface of the cylindrical surface faces the image source, and the incident angle scattered to two sides is reduced by the opposite surface, whereby the horizontal field angle can be further improved by the cylindrical surface.

According to the near-eye display device of the present disclosure, the first optical cavity and the second optical cavity are provided, the refractive elements are distributed within the first optical cavity and the second optical cavity, so that the thickness of the near-eye display device is reduced, moreover, a combination of the multiple array lenses 200, the first prism 120 and the second prism 130 is used, so that the field angle can be greatly improved.

What is claimed is:

1. A near-eye display device, comprising:
    a first optical cavity, comprising, in sequential order: a first prism, a first reflective polarizing film prism, a phase delay film, a wedge-shaped lens, and a second prism;
    a second optical cavity, comprising a plurality of array lenses arranged in sequence; and
    a first reflector, being disposed in correspondence with one end of the plurality of array lenses and the first reflective polarizing film prism;
    wherein the first optical cavity, the second optical cavity and the first reflector are configured to enable an image source to:
    be reflected into the first optical cavity through the first prism, pass through the first reflective polarizing film prism, the phase delay film and the wedge-shaped lens in sequential order, then pass through the wedge-shaped lens and the phase delay film after being reflected by the second prism, be reflected into the plurality of array lenses through the first reflective polarizing film prism, enter the first reflector through one end of the plurality of array lenses, be reflected back to the plurality of array lenses through the first reflector, and be reflected into an human eye through the plurality of array lenses.

2. The near-eye display device of claim 1, wherein the first prism is a bipyramidal prism.

3. The near-eye display device of claim 1, wherein the first light cavity is provided with a light guide plate.

4. The near-eye display device of claim 1, wherein the first reflective polarizing film prism and the first reflector are arranged obliquely.

5. The near-eye display device of claim 4, wherein the first optical cavity is further provided with a second reflector and a second reflective polarizing film prism, the second reflector is disposed corresponding to the first reflective polarizing film prism, the second reflective polarizing film prism is connected to the first reflective polarizing film prism, and the first optical cavity, the second optical cavity and the first reflector are configured to enable part of light to:
    be reflected by the first reflective polarizing film prism to the second reflector, be reflected by the second reflector to the second reflective polarizing film prism, pass through the second reflective polarizing film prism, the phase delay film and the wedge-shaped lens in sequential order, then pass through the wedge-shaped lens and the phase delay film after being reflected by the second prism, be reflected into the plurality of array lenses through the second reflective polarizing film prism, enter the first reflector through one end of the plurality of array lenses, be reflected back to the plurality of array lenses through the first reflector, and be reflected into an human eye through the plurality of array lenses.

6. The near-eye display device of claim 1, wherein the first reflector is a micro electro mechanical system reflector.

7. The near-eye display device of claim 1, wherein the phase delay film is a quarter-wavelength phase delay film.

8. The near-eye display device of claim 1, wherein the phase delay film is attached to the wedge-shaped lens.

9. The near-eye display device of claim 1, wherein a surface of the wedge-shaped lens facing away from the phase delay film is in a beveled structure.

10. The near-eye display device of claim 1, wherein a surface of the second prism facing the wedge-shaped lens is a cylindrical surface with a conical coefficient.

\* \* \* \* \*